(12) United States Patent
Romano et al.

(10) Patent No.: US 7,075,382 B2
(45) Date of Patent: Jul. 11, 2006

(54) METHOD AND APPARATUS FOR MODULATING A PULSE SIGNAL WITH A BIT STREAM

(75) Inventors: Joao Miguel Romano, Belleville, NJ (US); Shaomin Samuel Mo, Monmouth Junction, NJ (US); Alexander M. Haimovich, North Brunswick, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 130 days.

(21) Appl. No.: 10/789,507

(22) Filed: Feb. 27, 2004

(65) Prior Publication Data

US 2004/0222865 A1  Nov. 11, 2004

Related U.S. Application Data

(60) Provisional application No. 60/450,313, filed on Feb. 27, 2003.

(51) Int. Cl.
*H03K 7/00* (2006.01)

(52) U.S. Cl. ............... 332/106; 332/112; 375/238; 375/295; 375/259

(58) Field of Classification Search ............... 332/106; 375/259, 295, 238; 331/106, 112
See application file for complete search history.

(56) References Cited

U.S. PATENT DOCUMENTS 6,911,874 B1 * 6/2005 Dvorak .................. 332/112

OTHER PUBLICATIONS

Win, Moe Z., "On the Power Spectral Density of Digital Pulse Streams Generated by M-ary Cyclostationary Sequences in the Presence of Stationary Timing Jitter,", IEEE Transactions on Communications, Sep. 1998, pp. 1135-1145, vol. 46, No. 9.

* cited by examiner

*Primary Examiner*—Arnold Kinkead
(74) *Attorney, Agent, or Firm*—RatnerPrestia (57) ABSTRACT

A method and apparatus for modulating a pulse signal with a bit stream is disclosed. The pulse signal is modulated by selectively inverting and delaying signal pulses within the pulse signal responsive to bits within the bit stream.

31 Claims, 9 Drawing Sheets

FIG. 7A MONOCYCLE PULSE

FIG. 7B INVERTED MONOCYCLE PULSE

FIG. 7C DELAYED MONOCYCLE PULSE

FIG. 7D INVERTED AND DELAYED MONOCYCLE PULSE

FIG. 8

METHOD AND APPARATUS FOR MODULATING A PULSE SIGNAL WITH A BIT STREAM

RELATED APPLICATION

This application claims the benefit of the filing date of provisional application No. 60/450,313 entitled "BIORTHOGONAL MODULATION FOR SUPPRESSING ULTRA-WIDEBAND SPECTRAL LINES" filed Feb. 27, 2003, the contents of which are incorporated herein by reference.

FIELD OF THE INVENTION

The present invention relates to communication systems and, more particularly, to methods and apparatus for modulating a pulse signal with a bit stream.

BACKGROUND

Ultra Wideband (UWB) technology, which uses baseband pulses of very short duration to spread the energy of transmitted signals very thinly from near zero to several GHz, is presently in use in military applications. Commercial applications will soon become possible due to a recent Federal Communications Commission (FCC) decision that permits the marketing and operation of consumer products incorporating UWB technology.

The key motivation for the FCC's decision to allow commercial applications is that no new communication spectrum is required for UWB transmissions because, when they are properly configured, UWB signals can coexist with other application signals in the same spectrum with negligible mutual interference. In order to ensure negligible mutual interference, however, the FCC has specified emission limits for the UWB applications. For example, a basic FCC requirement is that UWB systems do not generate signals that interfere with other narrowband communication systems.

The emission profile of a UWB signal can be determined by examining its power spectral density (PSD). The PSD for ideal synchronous data pulse streams based upon stochastic theory is well known and is described in an article by M. Z. Win, entitled "Spectral Density of Random Time-Hopping Spread-Spectrum UWB Signals with Uniform Timing Jitter", *Proc. MICOM'99*, vol. 2, pp. 1196–1200, 1999. This article also provides a characterization of the PSD of the Time-Hopping Spread Spectrum signaling scheme in the presence of random timing jitter using a stochastic approach.

The power spectra of UWB signals consist of continuous and discrete components. Generally speaking, discrete components contribute more to the PSD than continuous components, which behave as white noise. Thus, discrete components cause more interference to narrowband wireless systems than continuous components. Accordingly, a basic objective in the design of UWB systems is to reduce the discrete component of the UWB power spectra. Another objective for UWB systems is to increase the power efficiency.

UWB communication system currently use one of two modulation techniques. These techniques include a pulse position modulation (PPM) technique and a bi-phase shift keying (BPSK) technique. The PPM technique has good power efficiency but a relatively high PSD. The BPSK technique, on the other hand, has a relatively low PSD but low power efficiency.

There is an ever present desire for efficient communication systems that transmit signals with low PSD. Accordingly, there is a need for improved modulation methods, apparatus, and systems that are not subject to the above limitations. The present invention fulfils this need among others.

SUMMARY OF THE INVENTION

The present invention is embodied in a method and an apparatus that modulates a pulse signal with a bit stream. The pulse signal is modulated by selectively inverting and delaying signal pulses within the pulse signal responsive to bits within the bit stream.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

Figure 1:
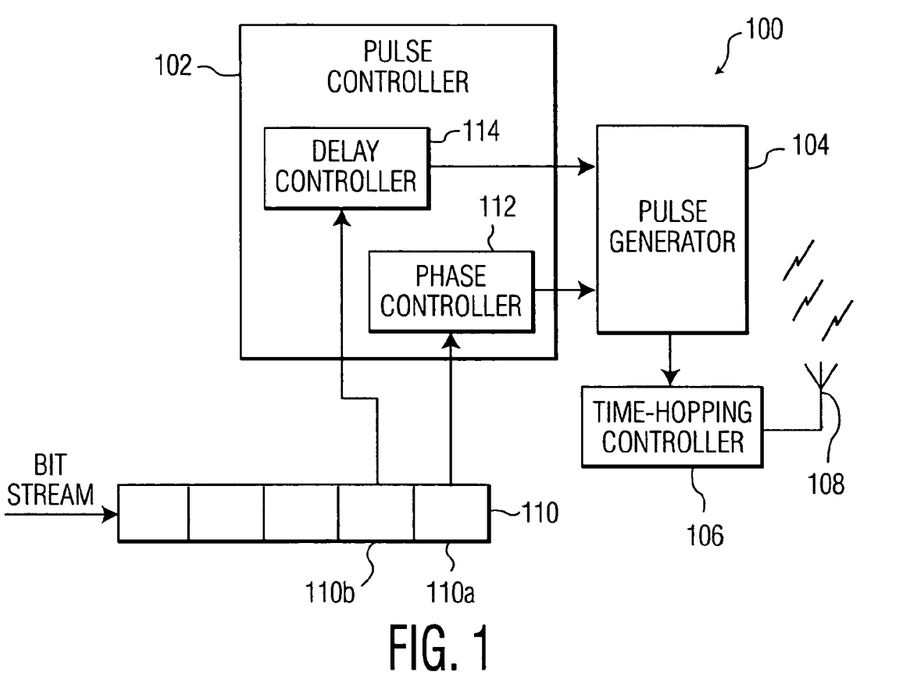
FIG. 1 is a block diagram of a transmitter for modulating a pulse signal with a bit stream in accordance with the present invention.

FIG. 1 depicts select components of an exemplary transmitter 100 for modulating a pulse stream with a bit stream for transmission in accordance with the present invention. A controller 102 includes a phase controller 112 and a delay controller 114. In the illustrated embodiment, the phase controller 112 and the delay controller 114 are each coupled to the pulse generator 104 and to a shift register 110. The phase controller 112 is coupled to a first position 110a of the shift register (e.g., to receive a first bit of the bit stream) and the delay controller 114 is coupled to a second position 110b of the shift register (e.g., to receive a second bit of the bit stream). It will be recognized by those of skill in the art that the designation of first and second positions 110*a* and 110*b* is for ease of description and not to suggest a particular bit processing order. For example, the phase controller 112 and delay controller 114 may be coupled to the second position 110*b* and the first position 110*a*, respectively. Also, the first and second register positions referred to with numerals "110*a*" and "110*b*" may be interchanged.

In an exemplary embodiment, the shift register 110 is a shift register that shifts two bits of the bit stream during each shift such that the controller 102 receives two new bits of the bit stream for processing at each shift. In an alternative exemplary embodiment, the shift register shifts one bit at a time and the controller 102 is configured to pass the bits to the appropriate phase/delay controller 112/114. Various other embodiments will be apparent to those of skill in the art from the description herein. The phase/delay controllers 112/114 may each be a latch that produces the value of the received bit at an output port.

A pulse generator 104 generates a pulse signal that includes a plurality of signal pulses. The pulse generator 104 is coupled to the phase controller 112 and the delay controller 114 to receive a phase signal and a delay signal, respectively, therefrom. In an exemplary embodiment, the pulse generator is a monocycle pulse signal generator that generates monocycle pulse signals such as a UWB pulse generator that generates UWB signal pulses.

The pulse generator 104 alters the signal pulses within the pulse signal responsive to the phase signal and the delay signal received, respectively, from the phase controller 112 and the delay controller 114. In an exemplary embodiment, for a monocycle pulse signal, the pulse generator 104 selectively inverts the signal pulses responsive to the phase signal and selectively delays the signal pulse by a predefined amount responsive to the delay signal. Thus, the pulse generator 104 may alter the pulse signal by producing signal pulses with no delay or inversion, a delay, an inversion, or a delay and an inversion. In an exemplary embodiment, the signal pulse is delayed by an amount sufficient to substantially decorrelate a delayed signal pulse from the signal pulse prior to delay. For example, the signal pulses may be delayed such that a delayed signal pulse is orthogonal to the signal pulse prior to delay. The altering of the signal pulses is described in further detail below.

Figure 1A:
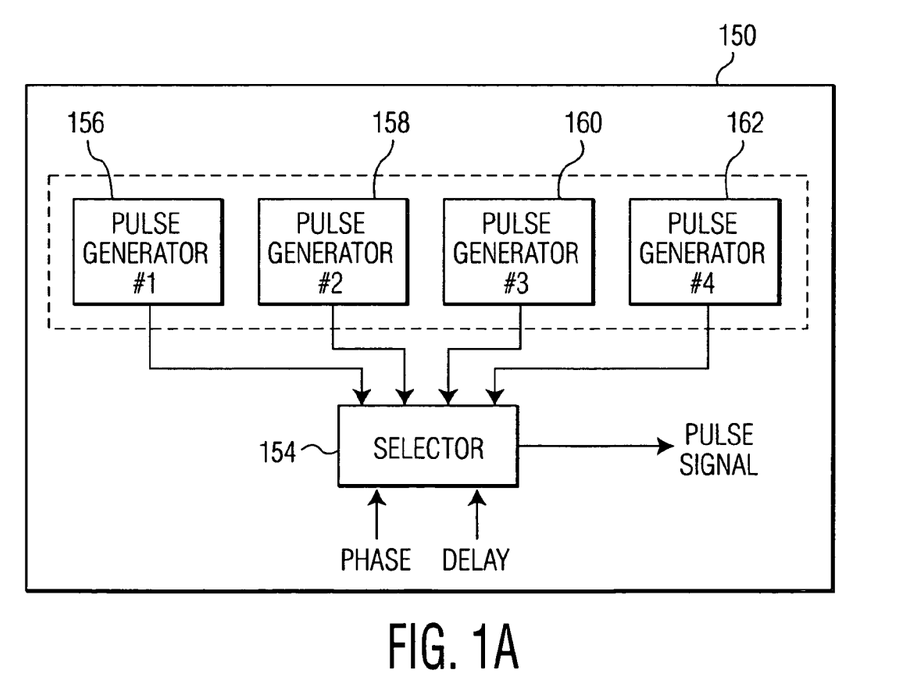
FIGS. 1A, 1B and 1C are block diagrams of alternative exemplary pulse generators in accordance with the present invention for use in the transmitter of FIG. 1.

FIG. 1A depicts an exemplary pulse generator 150 for use as the pulse generator 104 (FIG. 1). The alternative exemplary pulse generator 150 includes a plurality of pulse generators 152 that each generate a signal pulse. A selector 154 is coupled to the plurality of pulse generators 152, the phase controller 112 (FIG. 1), and the delay controller 114 (FIG. 1). The selector 154 is configured to select a signal pulse generated by a particular one of the plurality of pulse generators 152 responsive to phase and delay signals from the phase controller 112 and the delay controller 114, respectively. The illustrated plurality of pulse generators 152 include a first pulse generator 156, a second pulse generator 158, a third pulse generator 160, and a fourth pulse generator 162. The first pulse generator 156 may be configured to generate a first signal pulse without either delay or inversion. The second pulse generator 158 may be configured to generate a second signal pulse that is inverted but not delayed with respect to the first signal pulse. The third signal pulse generator 160 may be configured to generate a third signal pulse that is delayed by not inverted with respect to the first signal pulse. The fourth pulse generator 158 may be configured to generate a fourth signal pulse that is both delayed and inverted with respect to the first signal pulse. By selecting one of the first through fourth signal pulses responsive to the phase and delay signals, the selector 154 is able to produce signal pulses that are selectively inverted and delayed.

Figure 1B:
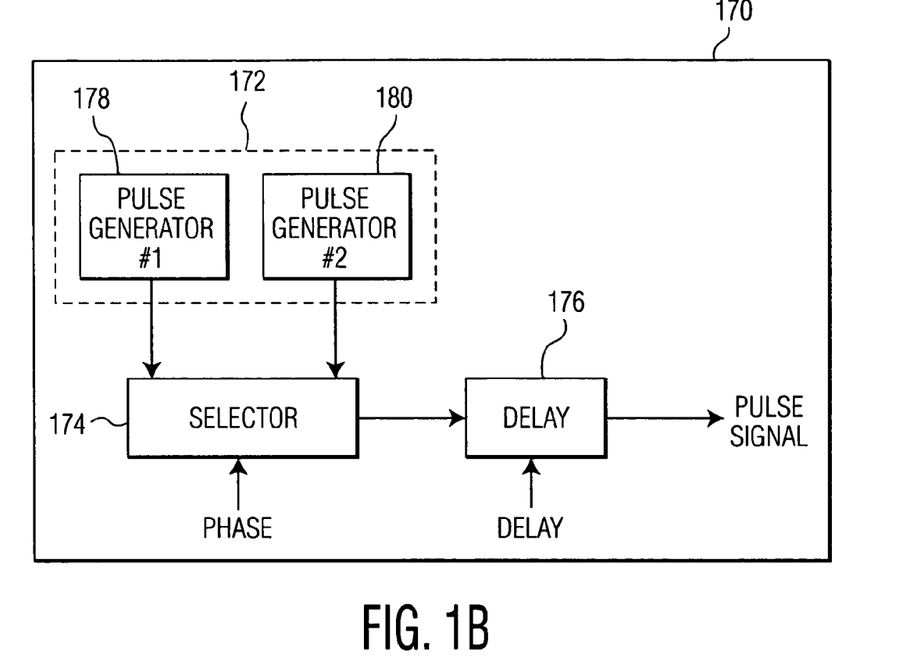

FIG. 1B depicts an alternative exemplary pulse generator 170 for use as the pulse generator 104 (FIG. 1). The alternative exemplary pulse generator 170 includes a pair of pulse generators 172 that each generate a signal pulse. A selector 174 is coupled to the pair of pulse generators 172 and the phase controller 112 (FIG. 1). A delay circuit 176 is coupled to the selector 174 and the delay controller 114 (FIG. 1). The selector 174 is configured to select a signal pulse generated by a particular one of the pair of pulse generators 172 responsive to phase signals from the phase controller 112 and the delay circuit 176 is configured to selectively introduce delay responsive to delay signals from the delay controller 114. The illustrated pair of pulse generators 172 include a first pulse generator 178 and a second pulse generator 180. The first pulse generator 178 may be configured to generate a first signal pulse without inversion. The second pulse generator 180 may be configured to generate a second signal pulse that is inverted with respect to the first signal pulse. By selecting one of the first and second signal pulses responsive to the phase signal and selectively introducing delay to the selected signal pulse responsive to the delay signal, the selector 174 and delay circuit 176 are able to produce signal pulses that are selectively inverted and delayed. It will be understood by those skilled in the art that the delay circuit 176 may be positioned to introduce delay to the signal pulses generated by the pair of pulse generators 172 prior to selection of a particular signal by the selector 174. Various alternative arrangements will be understood by those of skill in the art from the above description.

Figure 1C:
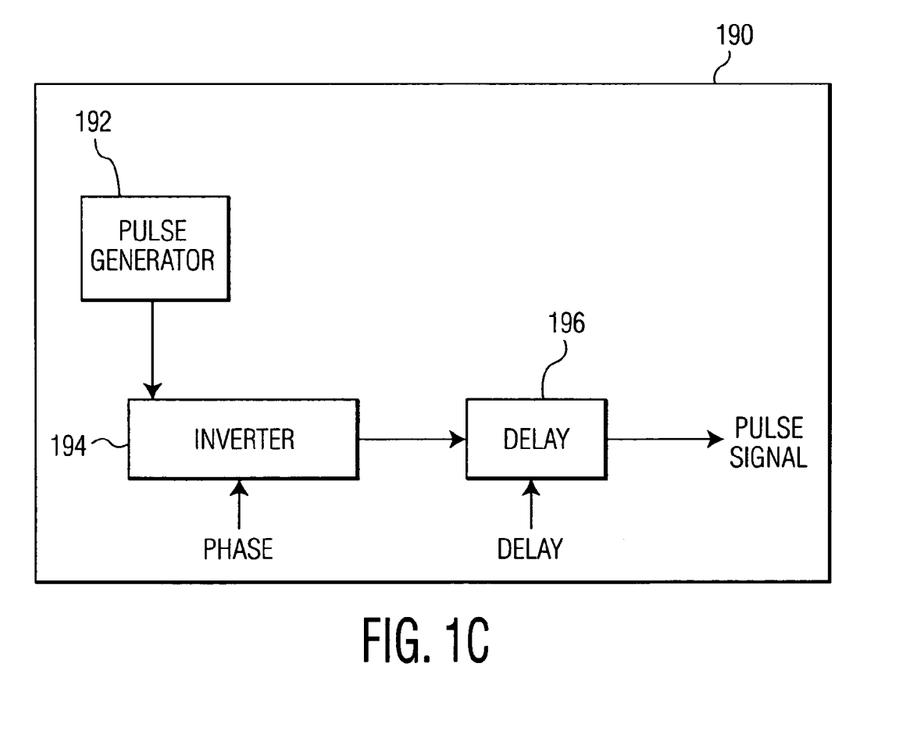

FIG. 1C depicts an alternative exemplary pulse generator 190 for use as the pulse generator 104 (FIG. 1). The alternative exemplary pulse generator 190 includes a single pulse generator 192 that generates a signal pulse. An inverter 194 is coupled to the pulse generator 192 and the phase controller 112 (FIG. 1). A delay circuit 196 is coupled to the inverter 194 and the delay controller 114 (FIG. 1). The inverter 194 is configured to selectively invert the signal pulse responsive to the phase signal from the phase controller 112 and the delay circuit is configured to selectively delay the signal pulse responsive to the delay signal from the delay controller 114 to produce signal pulses that are selectively inverted and delayed. It will be understood by those skilled in the art that the delay circuit 196 may be positioned to introduce delay to the signal pulse generated by the pulse generator 192 prior to selective inversion by the inverter 194. Various alternative arrangements will be understood by those of skill in the art from the above description.

Referring back to FIG. 1, an optional time-hopping controller 106 introduces time-hopping to the pulse signal to position each signal pulse at a different time-hop index inside a frame. In the illustrated embodiment, the time-hopping controller 106 is coupled to the pulse generator 104. In an exemplary embodiment, the time-hopping controller 106 introduces time-hopping to the pulse signal selectively inverted and delayed 102 in a conventional manner.

The antenna 108 transmits the pulse signal. In the illustrated embodiment, the antenna 108 is coupled to the time-hopping controller 106. In this embodiment, the antenna 108 transmits a pulse signal as altered according to the pulse controller 102 and time-hopped by the time-hopping controller 106. In embodiments where the pulse signal is not time-hopped, the antenna 108 is coupled to the pulse generator 104 for transmitting the pulse signal without time-hopping. The pulse signal as selectively inverted and delayed and, optionally, as time-hopped is transmitter via the antenna 108.

A receiver (not shown) receives the pulse signal from the transmitter 100. In an exemplary embodiment, the receiver uses a predefined pulse template to correlate incoming signals and, then, performs an integration over the pulse template. The template shifts forward and backward to find peaks of the integration. The position of the peak is used to identify the position of pulses in the PPM and the polarity of the peaks is used to determine phase (e.g., positive maximum value indicates normal phase and negative maximum value indicates inverted phase). If the optional time-hopping controller 106 is used in the transmitter 100, it is desirable for the receiver to employ a complementary time-hopping controller (not shown) having the same time-hopping sequence used by the time-hopping controller 106 to locate each of the transmitted pulses in each frame so that the pulse signal can be recovered.

Figure 2:
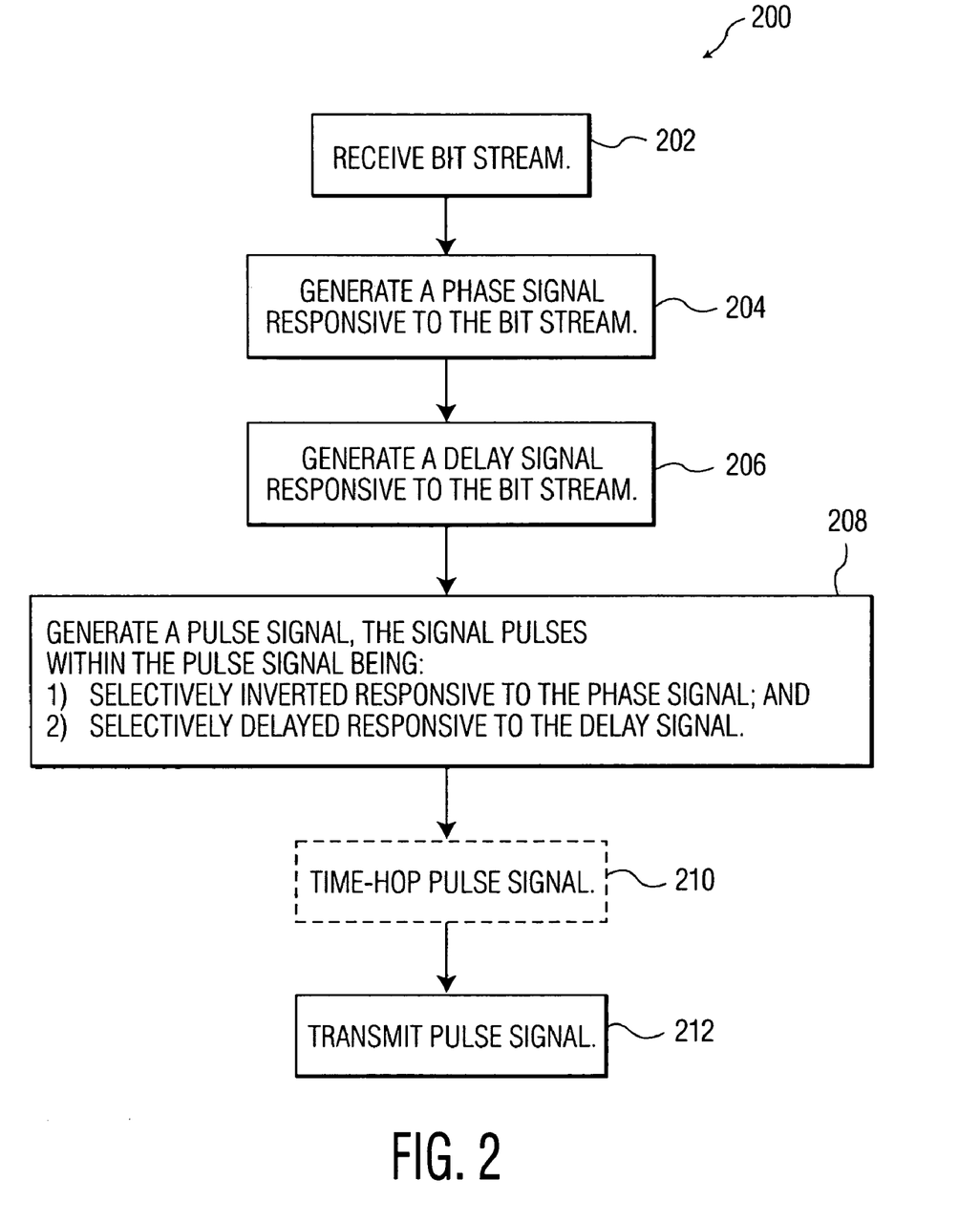
FIG. 2 is a flow chart of exemplary steps for modulating a pulse signal with a bit stream in accordance with the present invention.

FIG. 2 depicts a flow chart 200 of exemplary steps for modulating a pulse signal for transmission. The exemplary steps are described with reference to FIG. 1. At block 202, the shift register 110 receives a bit stream. In an exemplary embodiment, the shift register 110 shifts the bit stream through the shift register 110 two bits at a time.

At block 204, the phase controller 112 generates a phase signal responsive to the bit stream. In an exemplary embodiment, the phase controller 112 generates a phase signal responsive to a first bit of the bit stream and every other bit thereafter. In an alternative exemplary embodiment, the phase controller 112 generates the phase signal responsive to a second bit of the bit stream and every other bit thereafter. The phase signal may be a binary signal that is set to a relatively high (low) value when a bit is high (i.e., a logical one "1") and is set to a relatively low (high) value when the bit is low (i.e., a logical zero "0").

At block 206, the delay controller 114 generates a delay signal responsive to the bit stream. In an exemplary embodiment, the delay controller 114 generates a delay signal responsive to a second bit of the bit stream (i.e., the next consecutive bit following the first bit) and every other bit thereafter. In an alternative exemplary embodiment, the delay controller 114 generates the delay signal responsive to the first bit of the bit stream and every other bit thereafter. The delay signal may be a binary signal that is set to a relatively high (low) value when a bit is high and is set to a relatively low (high) value when the bit is low.

At block 208, the pulse generator 104 generates the pulse signal responsive to the phase signal and the delay signal received from the pulse controller 102. The pulse generator 104 selectively inverts signal pulses responsive to the phase signal and selectively delays signal pulses responsive to the delay signal. In an exemplary embodiment, where a single pulse generator 192 (see FIG. 1C) is used in the pulse generator 104, the pulse generator 104 does not alter the signal pulse if the phase signal and the delay signal are both relatively high (low), delays the signal pulse if the phase signal is relatively low (high) and the delay signal is relatively high (low), inverts the signal pulse if the phase signal is relatively high (low) and the delay signal is relatively low (high), and inverts and delays the signal pulse if both the phase signal and the delay signal are relatively high (low).

In an alternative exemplary embodiment, where a plurality of pulse generators 152 (see FIG. 1A) are used in the pulse generator 104, the selector 154 selects a first signal pulse (which is not delayed and not inverted) produced by the first pulse generator 156 if the phase signal and the delay signal are both relatively high (low), selects a second signal pulse (which is delayed and not inverted) produced by the second pulse generator 158 if the phase signal is relatively low (high) and the delay signal is relatively high (low), selects a third signal pulse (which is inverted and not delayed) produced by the third pulse generator 160 if the phase signal is relatively high (low) and the delay signal is relatively low (high), and selects a fourth signal pulse (which is delayed and inverted) produced by the fourth pulse generator 162 if both the phase signal and the delay signal are relatively high (low).

In an alternative exemplary embodiment, where a pair of pulse generators 172 (see FIG. 1B) are used in the pulse generator 104, the selector 174 selects a first signal pulse (which is not inverted) produced by the first pulse generator 178 if the phase signal is relatively high (low) and selects a second signal pulse (which is inverted with respect to the first signal pulse) produced by the second pulse generator 180 if the phase signal is relatively low (high). The delay circuit 176 then introduces delay to the selected signal if the delay signal is relatively high (low) and does not introduce delay if the delay signal is relatively low (high).

Figure 7A:
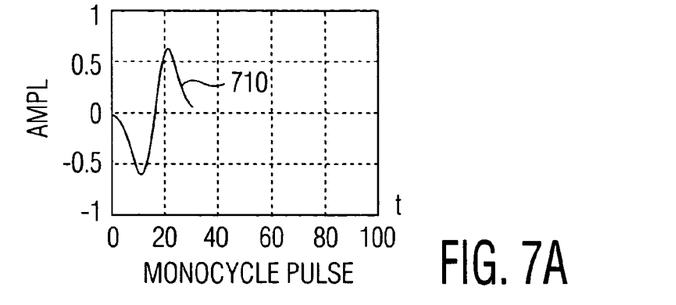
FIGS. 7A, 7B, 7C and 7D are graphs of amplitude versus time which illustrate a monocycle pulse, an inverted monocycle pulse, a delayed monocycle pulse, and an inverted and delayed monocycle pulse, respectively, in accordance with the present invention.
Figure 7B:
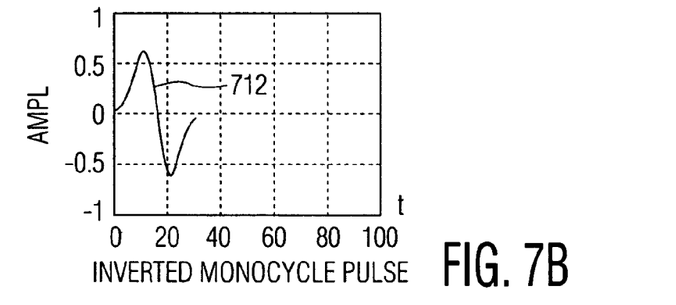
Figure 7C:
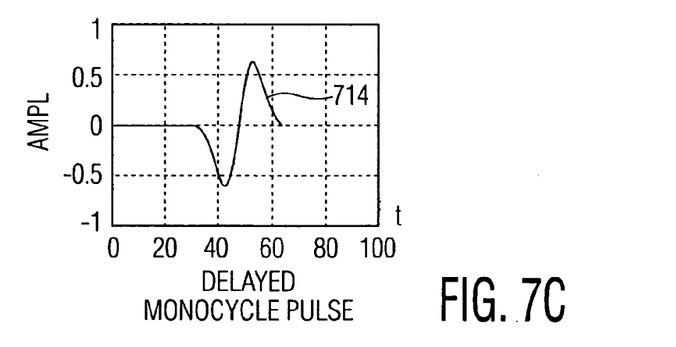
Figure 7D:
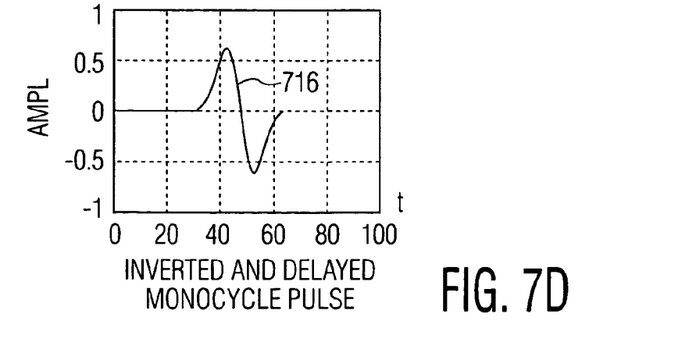

Exemplary pulses are shown in FIGS. 7A, 7B, 7C, and 7D. FIG. 7A depicts a monocycle pulse 710. FIG. 7B depicts an inverted monocycle pulse 712. FIGS. 7C and 7D depict a delayed monocycle pulse 714 and a delayed and inverted monocycle pulse 716, respectively. Because there are four possible pulses, each pulse may represent two bits of the bit stream. The pulses may be assigned as shown in Table 1.

TABLE 1

| Value (first bit, second bit) | Pulse |
|---|---|
| 0, 0 | monocycle pulse |
| 0, 1 | inverted monocycle pulse |
| 1, 0 | delayed monocycle pulse |
| 1, 1 | delayed and inverted monocycle pulse |

Referring back to FIG. 2, at block 210, the optional time-hopping controller 106 time-hops the pulse signal. In an exemplary embodiment, the time-hopping controller 106 places each modulated signal pulse at a different time-hop index inside a frame. Each modulated signal pulse may be repeated inside the frame or across multiple frames in order to provide redundancy for a multiple-access environment. In an alternative exemplary embodiment, the pulse signal is not time-hopped and the step in block 210 can be eliminated.

At block 212, the transmitter 100 transmits the pulse signal via the antenna 108. In an exemplary embodiment, the pulse signal, as selectively inverted, delayed, and time-hopped, is transmitted. In an alternative exemplary embodiment, the pulse signal as selectively inverted and delayed is transmitted without time-hopping.

Additional details regarding modulation techniques for use with UWB signals will now be described. UWB signals can be modeled as shown in equation (1).

$$S(t) = \sum_{l=-\infty}^{\infty} \frac{1}{N} \sum_{i=0}^{N-1} A_l \cdot X_{pulse}(t - i \cdot T_{PPM} - l \cdot T_{symbol}) \quad (1)$$

In equation (1), $A_l$ and $T_{PPM}$ represent the data, and $T_{symbol}$ represents the symbol index that is being transmitted. $X_{pulse}$ represents the waveform including pulse shape and transmission power. There are different techniques for transmitting data over an UWB channel. These methods are now described.

Figure 3:
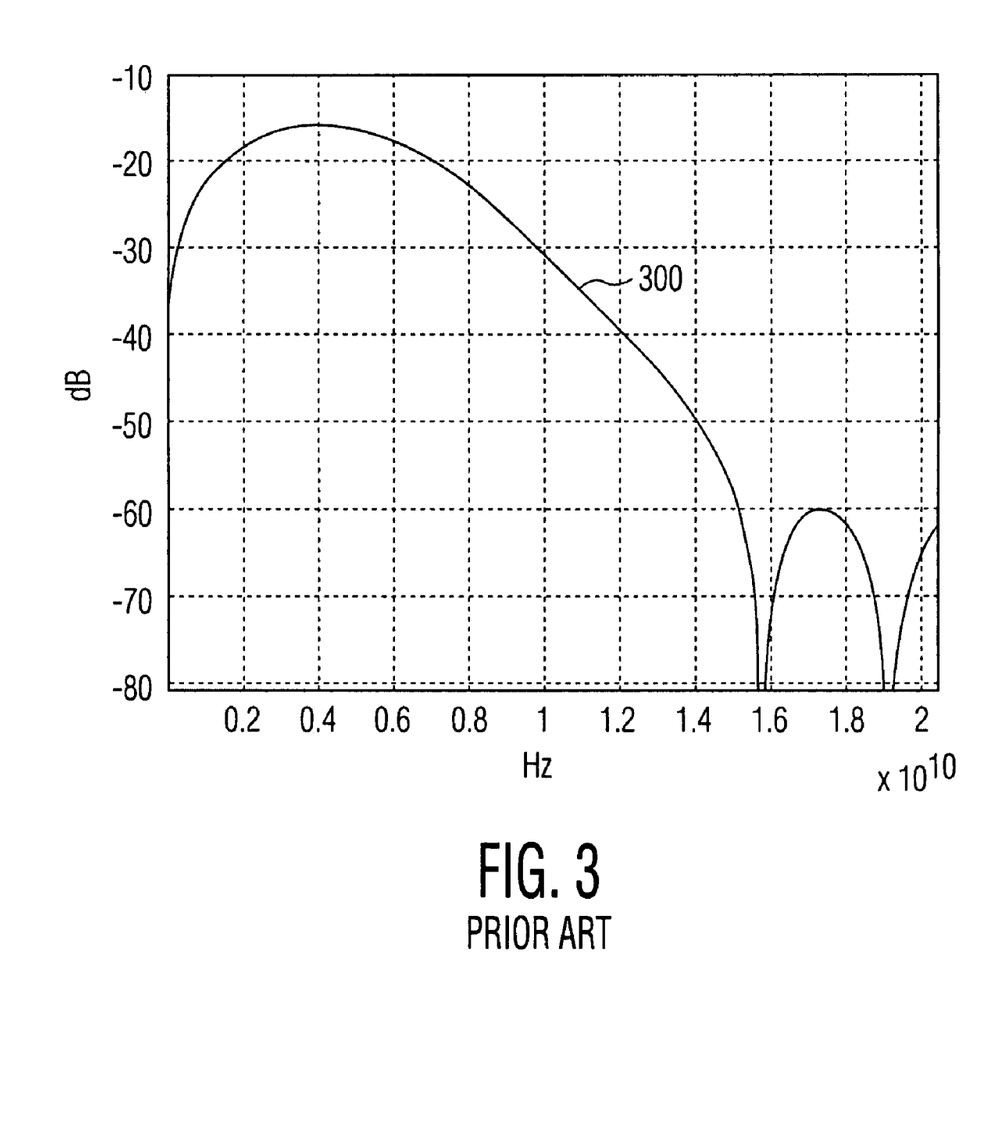
FIG. 3 is a graph of amplitude versus frequency that shows the power-spectral density (PSD) of a single monocycle pulse.

The PSD for the monocycle pulse typically used in UWB communications is shown as plot 300 in FIG. 3. This plot and the other PSD plots depicted in FIGS. 4–8 were generated using a simulation in which each pulse is represented by 64 samples and each frame is 64 times longer than a single pulse, thus, a frame includes 2048 samples. Each simulation was run for 3,000 repetitions. The number of points in the fast Fourier transform (FFT) was 262,144. In each repetition, the data being sent was randomized 128 times. The randomization included both bi-phase and pulse position randomness. All of the PSD plots are generated using the Bartlett periodogram method described in a text by J. G. Proakis et al. entitled *Digital Signal Processing*, Prentice Hall, third edition, 1996.

Pulse position modulation (PPM) is now described. PPM is one of the most popular modulation methods used in UWB communication systems. The major advantage of PPM is its power efficiency, i.e., as the number of levels (M) increase, there is no corresponding increase in power. The number of levels indicate the number of modulation positions. For example, for M-PPM, where M=2, two (2) modulation positions are needed; where M=4, four (4) modulation positions are needed. As shown in the following equations, however, PPM modulation has relatively high power spectral lines in its PSD. Therefore, if data is transmitted using PPM modulation, the average power per pulse may need to be reduced for the power spectral density of the pulse to be within emission limits specified by the FCC for UWB communications (referred to herein as the FCC mask), which is undesirable.

Equation (2) below, is taken from a textbook by S. Wilson entitled *Digital Modulation and Coding Prentice Hall*, 1995. This equation is used to calculate the PSD for the PPM modulation.

$$S_{yy-ppm} = \frac{1}{M^2 T_f^2} \sum_{n=-\infty}^{\infty} \left| \sum_i S_i\left(\frac{n}{T_f}\right) \right|^2 \delta\left(f - \frac{n}{T_f}\right) + \frac{1}{T_f}\left[\sum_i \frac{1}{M}|S_i(f)|^2 - \left|\sum_i \frac{1}{M}S_i(f)\right|^2\right] \quad (2)$$

In equation (2), $S_i(f)$ is the Fourier transform of the monocycle pulse, $T_f$ is the frame time, and M the number of levels. A new parameter may be introduced to form a new equation, e.g., one for 2-PPM modulation in which each pulse is positioned in one of two positions during modulation. The Fourier transform for 2-PPM is given by equation (3).

$$H_{2-ppm}(f) = \sum_{k=0}^{1} \text{Exp}\left[-j\omega\left(\frac{T_p}{4} + \frac{T_p}{2}k\right)\right] \quad (3)$$

In equation (3), $T_p$ is the pulse time.

Combining equations (2) and (3) yields equation (4).

$$S_{yy-2ppm} = \frac{1}{4T_f^2} \sum_{n=-\infty}^{\infty} \left|\sum_{k=0}^{1} S(f)\text{Exp}\left[-j\omega\left(\frac{T_p}{4} + \frac{T_p}{2}k\right)\right]\right|^2 \delta\left(f - \frac{n}{T_f}\right) + \ldots + \frac{1}{T_f}\left[\left|\sum_{k=0}^{1}\frac{1}{2}S(f)\text{Exp}\left[-j\omega\left(\frac{T_p}{4} + \frac{T_p}{2}k\right)\right]\right|^2 - \left|\sum_{k=-0}^{1}\frac{1}{2}S(f)\text{Exp}\left[-j\omega\left(\frac{T_p}{4} + \frac{T_p}{2}k\right)\right]\right|^2\right] \quad (4)$$

$$= \frac{1}{4T_f^2}\sum_{n=-\infty}^{\infty} S^2\left(\frac{n}{T_f}\right)\cos^2\left(\omega\frac{T_p}{4}\right)\delta\left(f - \frac{n}{T_f}\right) + \frac{1}{T_f}\left[S^2(f) - \frac{1}{2}S^2(f) - \frac{1}{2}S^2(f)\cos^2\left(\omega\frac{T_p}{4}\right)\right]$$

It is noted that equation (4) includes two components: a discrete component and a continuous component. The discrete component, which represents the spectral lines encountered in PPM modulation, is shown in equation (5).

$$S_{yy-disc} = \frac{1}{4T_f^2}\sum_{n=-\infty}^{\infty} S^2\left(\frac{n}{T_f}\right)\cos^2\left(\pi\frac{nT_p}{2T_f}\right)\delta\left(f - \frac{n}{T_f}\right) \quad (5)$$

The continuous component, which represents the pulse shape and the pulse position modulation filter, is shown in equation (6).

$$S_{yy-cont} = \frac{1}{T_f}\left[S^2(f) - \frac{1}{2}S^2(f)\cos^2\left(\omega\frac{T_p}{4}\right)\right] \quad (6)$$

Figure 4:
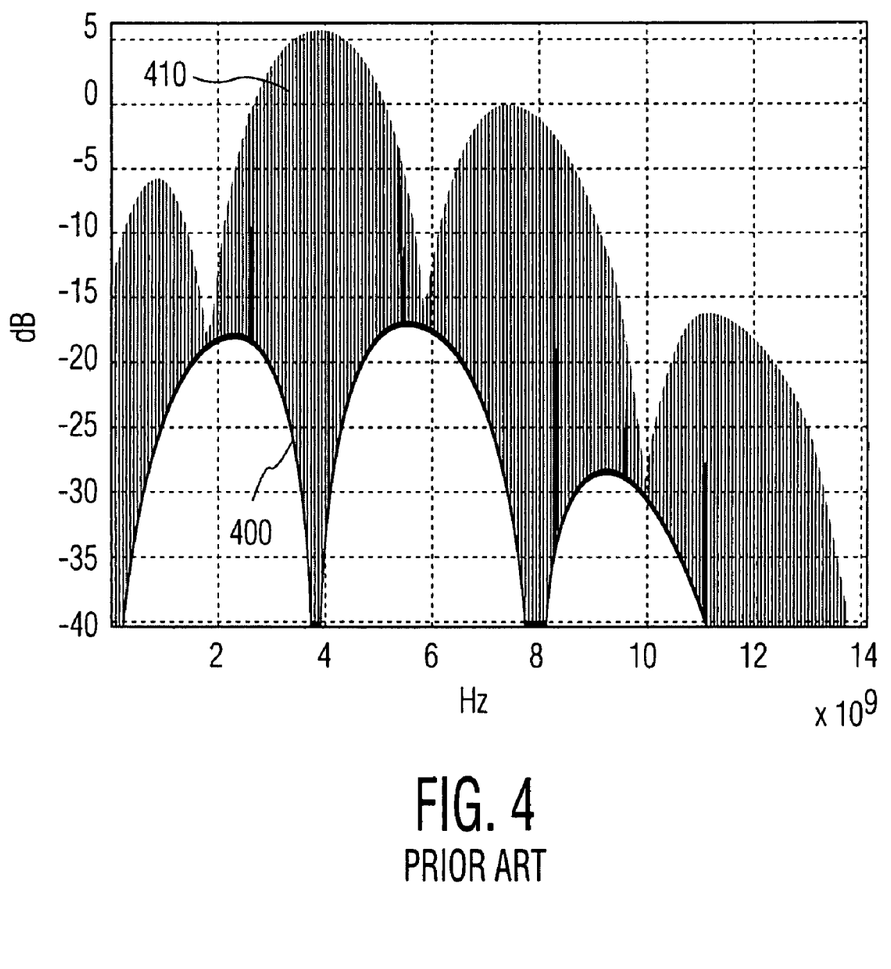
FIG. 4 is a graph of amplitude versus frequency that shows the PSD of a pulse-position modulated ultra-wideband (UWB) signal in accordance with prior art.

The PSD derived from the PPM signal is shown in FIG. 4. FIG. 4 clearly shows both the power spectrum 400 of the pulse shape and the power spectrum of the discrete components 410. The spectral lines 410 are relatively high. Accordingly, the average power per pulse is desirably reduced to fit the signal within the FCC mask for UWB transmission.

Figure 5A:
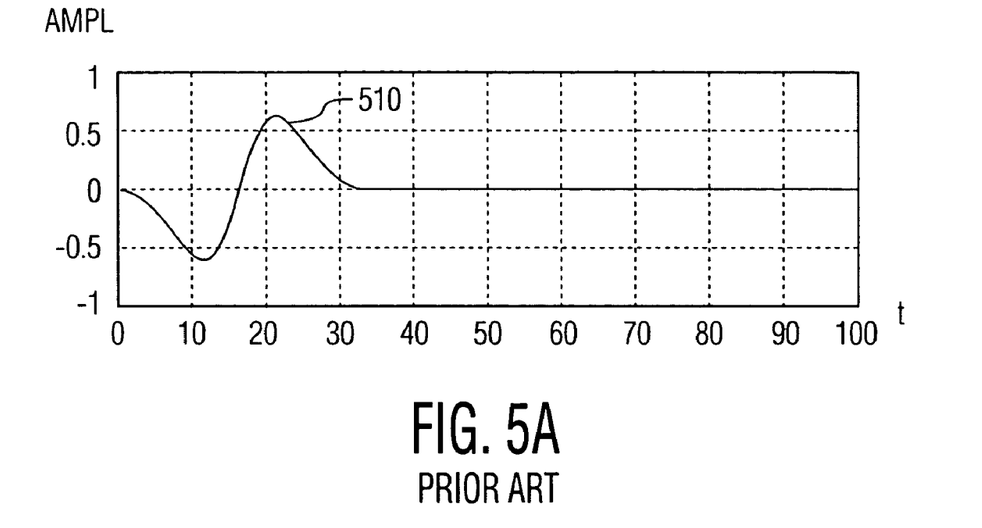
FIGS. 5A and 5B are graphs of amplitude versus time which illustrate a monocycle pulse and an inverted monocycle pulse, respectively, in accordance with prior art.
Figure 5B:
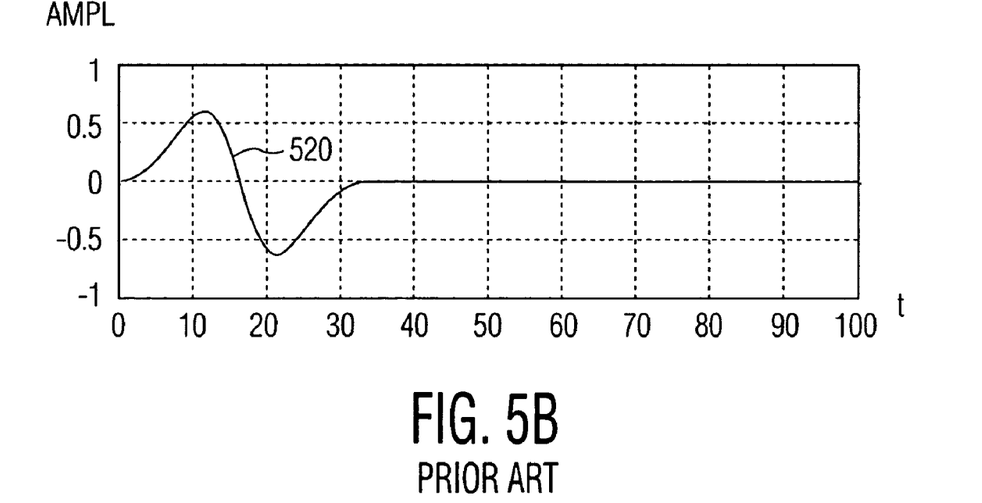

Bi-phase shift keying (BPSK) modulation in now described. With BPSK modulation the spectral lines associated with the power spectral density of the signal itself are reduced, which is an advantage over PPM modulation; however, power efficiency with BPSK modulation decreases for M≧4. BPSK modulation uses a monocycle pulse and its inverse to transmit data. The monocycle pulse represents one logic state, for example, logic one ("1") and the inverse pulse represents the other state, for example, logic zero ("0"). FIGS. 5A and 5B show a waveform 510 of the monocycle pulse and the waveform 520 of its inverse, respectively.

The PSD for a BPSK modulated signal is now derived. The data stream transmitted using the BPSK signal is assumed to be perfectly random and, thus, the BPSK modulation may be represented as shown in equation (7).

$$S_i(f) = \Sigma_{i=0}^{1}(2i-1)\Phi(f) \quad (7)$$

In equation (7), $\Phi(f)$ represents the pulse shape. Introducing this model into the above power spectrum equation, produces equation (8).

$$S_{yy} = \frac{1}{4T_f^2} \sum_{n=-\infty}^{\infty} \left| \sum_{i=0}^{1} (2i-1)\Phi(f) \right|^2 \delta\left(f - \frac{n}{T_f}\right) + \qquad (8)$$

$$\frac{1}{T_f} \left[ \frac{1}{2} \sum_{i=0}^{1} |(2i-1)\Phi(f)|^2 - \left| \sum_{i=0}^{1} (2i-1)\Phi(f) \right|^2 \right]$$

$$= \frac{1}{T_f} [\Phi^2(f)]$$

Figure 6:
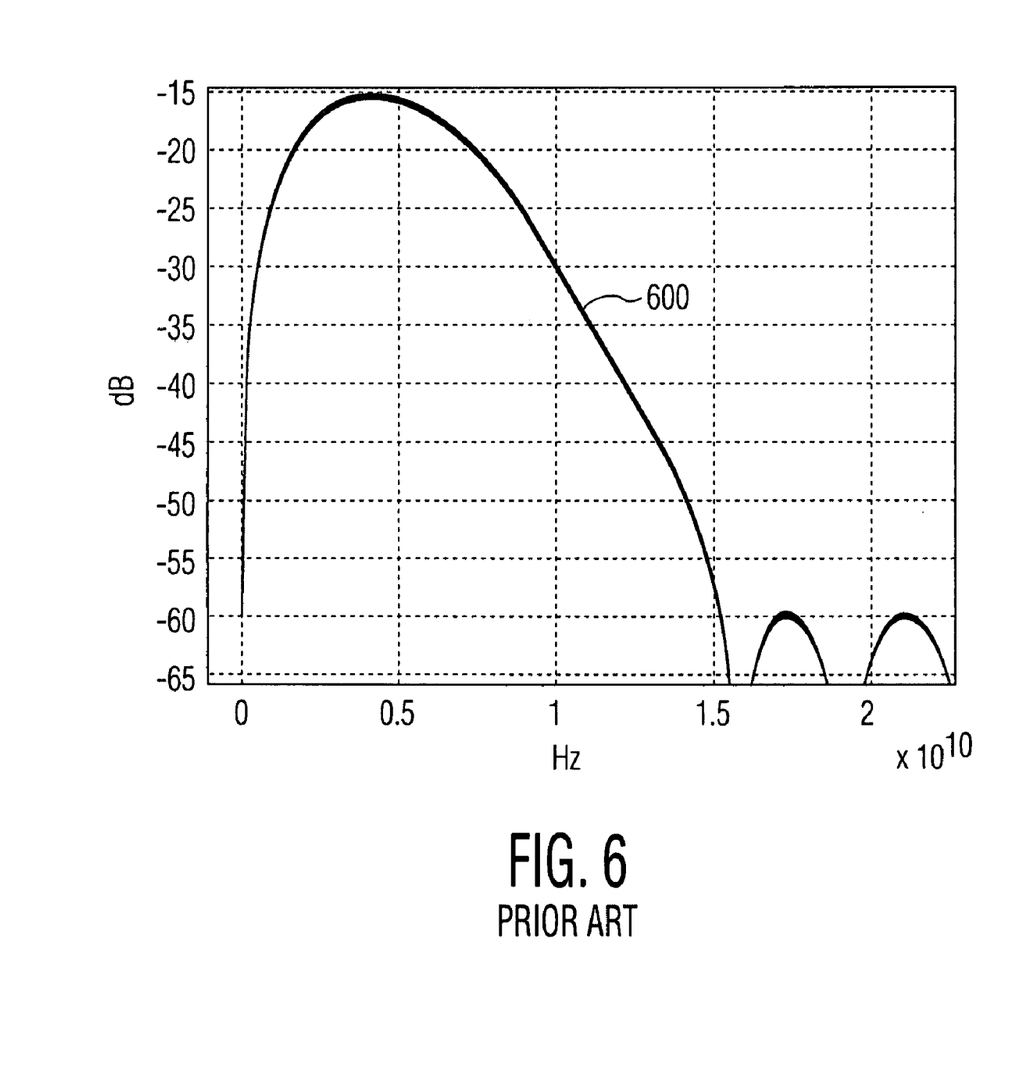
FIG. 6 is a graph of amplitude versus frequency that shows the PSD of a bi-phase modulated UWB signal in accordance with prior art.

The power spectrum 600 generated from the simulation using equation (8) is shown in FIG. 6.

As shown in FIG. 6, the PSD of a BPSK modulated random data signal is essentially the same as the PSD of the monocycle signal without any spectral lines. The difference in power between BPSK and PPM modulation as may be seen from FIGS. 4 and 6 is about 10 dB, which illustrates the advantage of bi-phase modulation. Moreover, because the PSD is essentially the PSD of the monocycle pulse, different pulse shapes can be tried in the simulation to identify shapes useful for UWB transmissions.

The modulation scheme of the present invention is now described. This scheme merges PPM and BPSK modulation to produce a modulation scheme referred to herein as biorthogonal modulation. The merging of these two techniques provides improved power efficiency and reduces/eliminates PSD spectral lines from the pulse shape. In an exemplary embodiment, biorthogonal modulation uses the monocycle pulses shown in FIGS. 7A, 7B, 7C and 7D.

Because the data stream is assumed to be perfectly random, the biorthogonal signal may be modeled as shown in equation (9).

$$S_i(f) = \sum_{i=0}^{1} \sum_{k=0}^{1} (2i-1)\Phi(f) \operatorname{Exp}\left[-j\omega\left(\frac{T_p}{4} + \frac{T_p}{2}k\right)\right] \qquad (9)$$

In this equation, $\Phi(f)$ represents the pulse shape.

Introducing this model into the above power spectrum equation (2) produces the power spectrum equation (10).

$$S_{yy} = \frac{1}{16T_f^2} \sum_{n=-\infty}^{\infty} \left| \sum_{i=0}^{1} \sum_{k=0}^{1} (2i-1)\Phi(f) \operatorname{Exp}\left[-j\omega\left(\frac{T_p}{4} + \frac{T_p}{2}k\right)\right] \right|^2 \qquad (10)$$

$$\delta\left(f - \frac{n}{T_f}\right) + \ldots +$$

$$\frac{1}{T_f} \left[ \frac{1}{4} \sum_{i=0}^{1} \sum_{k=0}^{1} \left| (2i-1)\Phi(f) \operatorname{Exp}\left[-j\omega\left(\frac{T_p}{4} + \frac{T_p}{2}k\right)\right] \right|^2 \right] - \ldots -$$

$$\frac{1}{T_f} \left[ \left| \sum_{i=0}^{1} \sum_{k=0}^{1} \frac{1}{4}(2i-1)\Phi(f) \operatorname{Exp}\left[-j\omega\left(\frac{T_p}{4} + \frac{T_p}{2}k\right)\right] \right|^2 \right]$$

$$= \frac{1}{T_f} [\Phi^2(f)]$$

Figure 8:
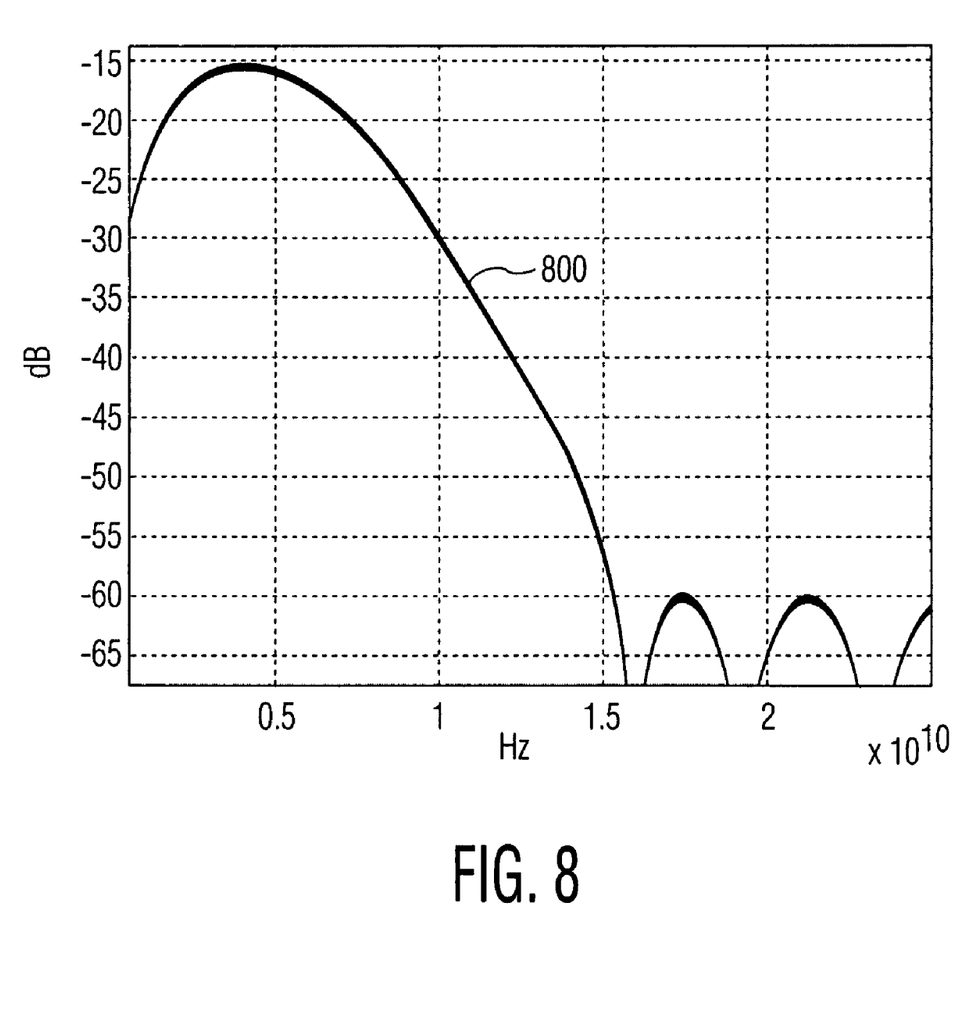
FIG. 8 is a graph of amplitude versus frequency that shows the PSD of a pulse signal in accordance with the present invention.

From equation (10), it is noted that biorthogonal modulation provides the PSD of the monocycle pulse essentially without any spectral lines (which is similar to the bi-phase modulation described above). This results from the random changing of the polarity of the pulse such that even when used in conjunction with PPM modulation there is no correlation between any of the present and future pulses. Therefore, because there is no correlation between pulses, the resulting PSD 800 is shown in FIG. 8. Thus, the PSD for biorthogonal modulation is essentially the same as for a BPSK signal with time-hopping in which the pulse is not repeated (i.e., one in which the polarity of the pulses are randomly changed over the hops).

This biorthogonal modulation method achieves several important results. By way of non-limiting example, this method provides the following four advantages. First, a user may send two bits per symbol instead of one bit as in a PPM or a BPSK modulation scheme. Second, this method may achieve the power efficiency of a PPM signal because the number of levels, $M_{ppm}$, may be increased (e.g., by increasing the number of possible delays for sending the bi-phase pulse) without increasing the average power. Third, this method substantially eliminates spectral lines due to no/low correlation between signal pulses. Fourth, this method enables multi-user access. From the simulations, it is seen that biorthogonal modulation achieves the same result as bi-phase modulation with an added feature that a user is sending two bits per symbol instead of one. Another advantage of biorthogonal modulation is that the power spectral density of the pulse is achieved. Therefore, one can meet the FCC mask requirement merely by using a pulse that has a PSD which meets the mask requirements.

The PSD for biorthogonal modulation is essentially the PSD of the monocycle pulse for biorthogonal modulated signals with time-hopping sequences when the pulse is not repeated between time-hops. Essentially from one time-hopping index to the next, a different modulated pulse is sent. This means, that no matter what pulse is used, it is expected that the PSD will be the PSD of the pulse shape by itself. The inventors have determined that the PSD of the monocycle pulse (i.e., the 2nd derivative of a Gaussian pulse) may not meet the PSD mask requirements imposed by the FCC. The inventors have also determined that higher derivatives of the Gaussian pulse (e.g. 5th order and above) meet these requirements. Because biorthogonal modulation maintains the PSD of the pulse shape, any pulse shape that has a PSD within the FCC mask may be used to meet the FCC's PSD mask requirements for the biorthogonal modulated signal without the need of any other pulse manipulation.

Although the invention has been described in terms of a transmitter 100 including a pulse controller 102, pulse generator 104, and time-hopping controller 106, it is contemplated that the invention may be implemented in software on a computer (not shown), such as a general purpose computer, special purpose computer, digital signal processor, microprocessor, microcontroller, or essentially any device capable of processing signals. In this embodiment, one or more of the functions of the various components may be implemented in software that controls the computer. This software may be embodied in a computer readable carrier, for example, a magnetic or optical disk, a memory-card or an audio frequency, radio-frequency, or optical carrier wave.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. An apparatus for modulating a bit stream onto a pulse signal for transmission, the apparatus comprising:

a pulse generator that generates a selectively delayed and inverted signal pulse responsive to a phase signal and a delay signal;

a phase controller coupled to the pulse generator, the phase controller configured to generate the phase signal responsive to a first data bit of the bit stream; and a delay controller coupled to the pulse generator, the delay controller configured to generate the delay signal responsive to a second data bit of the bit stream.

2. The apparatus of claim 1, wherein the pulse generator is a monocycle pulse generator and the signal pulse is a monocycle signal pulse generated by the monocycle pulse generator.

3. The apparatus of claim 1, wherein the pulse generator is an Ultra Wideband (UWB) pulse generator and the signal pulse is a UWB signal pulse.

4. The apparatus of claim 1, wherein the signal pulse is selectively delayed by an amount sufficient to substantially decorrelate the delayed signal pulse from a non-delayed signal pulse.

5. The apparatus of claim 4, wherein the delayed signal pulse is orthogonal to the non-delayed signal pulse.

6. The apparatus of claim 1, further comprising:
a time-hopping controller for time-hopping the signal pulse as selectively inverted and delayed.

7. The apparatus of claim 1, wherein the first and second data bits are consecutive bits that are represented by the signal pulse as selectively delayed and inverted.

8. The apparatus of claim 1, wherein the pulse generator comprises:
a first pulse generator that generates a non-inverted signal pulse with no delay;
a second pulse generator that generates a non-inverted signal pulse with a delay;
a third pulse generator that generates an inverted signal pulse with no delay;
a fourth pulse generator that generates an inverted signal pulse with the delay; and
a selector coupled to said first, second, third, and fourth pulse generators, the selector selecting the signal pulse generated by one of the first, second, third, and fourth pulse generators responsive to the phase signal and the delay signal.

9. The apparatus of claim 1, wherein the pulse generator comprises:
a pulse generator that generates a signal pulse, the pulse generator configured to selectively invert the signal pulse responsive to the phase signal and to selectively delay the signal pulse responsive to the delay signal.

10. The apparatus of claim 1, wherein the pulse generator comprises:
a first pulse generator that generates a first pulse;
a second pulse generator that generates a second pulse, the second pulse being inverted with respect to the first pulse;
a selector coupled to the first and second pulse generator, the selector selecting the first pulse generated by the first pulse generator or the second pulse generated by the second pulse generator responsive to the phase signal; and
a delay circuit coupled to the selector, the delay circuit introducing delay to the pulse selected by the selector responsive to the delay signal.

11. A method for modulating a bit stream onto a pulse signal for transmission, the method comprising the steps of:
selectively inverting a signal pulse responsive to a first bit of the bit stream; and
selectively delaying the signal pulse responsive to a second bit of the bit stream.

12. The method of claim 11, wherein the signal pulse is a monocycle signal pulse and wherein the inverting and delaying steps, respectively, comprise the steps of:
selectively inverting the monocycle signal pulse responsive to the first bit of the bit stream; and
selectively delaying the monocycle signal pulse responsive to the second bit of the bit stream.

13. The method of claim 12, wherein the monocycle signal pulse is an Ultra Wideband (UWB) signal pulse.

14. The method of claim 11, wherein the delaying step comprises the step of:
selectively delaying the signal pulse responsive to the second bit of the bit stream by an amount sufficient to substantially decorrelate the delayed signal pulse from the original signal pulse.

15. The method of claim 14, wherein the delaying step comprises the step of:
selectively delaying the signal pulse such that the delayed signal pulse is orthogonal to the signal pulse prior to delay.

16. The method of claim 11, further comprising:
time-hopping the signal pulse as selectively inverted and delayed.

17. The method of claim 11, wherein the inverting step comprises the steps of:
generating a phase signal responsive to the first bit; and
selectively inverting the signal pulse responsive to the phase signal.

18. The method of claim 11, wherein the delaying step comprises the steps of:
generating a delay signal responsive to the second bit; and
selectively delaying the signal pulse responsive to the delay signal.

19. A method for modulating a bit stream onto a pulse signal for transmission, the method comprising the steps of:
receiving a bit stream having a first and a second bit; and
selectively inverting and delaying a signal pulse responsive to the first and second bits of the bit stream.

20. The method of claim 19, wherein the inverting and delaying step comprises the steps of:
generating a phase signal and a delay signal responsive the first and second bits of the bit stream; and
selectively inverting and delaying the signal pulse responsive to the phase signal and the delay signal.

21. The method of claim 19, wherein the inverting and delaying step comprises the steps of:
generating a non-inverted signal pulse with no delay, a non-inverted signal pulse with delay, an inverted signal pulse without delay, and an inverted signal pulse with delay; and
selecting one of the generated signal pulses responsive to the first and second bits of the bit stream.

22. The method of claim 21, wherein the selecting step comprises the steps of:
generating a phase signal and a delay signal responsive the first and second bits; and
selecting one of the generated signal pulses responsive to the phase signal and the delay signal.

23. The method of claim 19, wherein the inverting and delaying step comprises the steps of:
generating a non-inverted signal pulse and an inverted signal pulse;
selecting one of the generated signal pulses responsive to the first bit of the bit stream; and selectively delaying the selected one of the generated signal pulses responsive to the second bit of the bit stream.

24. A system for modulating a bit stream onto a pulse signal for transmission, the system comprising:
   means for selectively inverting a signal pulse responsive to a first bit of the bit stream; and
   means for selectively delaying the signal pulse responsive to a second bit of the bit stream.

25. The system of claim 24, further comprising:
   means for time-hopping the signal pulse as selectively inverted and delayed.

26. The system of claim 24, wherein the inverting means comprises:
   means for generating a phase signal responsive to the first bit; and
   means for selectively inverting the signal pulse responsive to the phase signal.

27. The system of claim 24, wherein the delaying means comprises:
   means for generating a delay signal responsive to the second bit; and
   means for selectively delaying the signal pulse responsive to the delay signal.

28. A computer readable carrier including software that is configured to control a computer to implement a modulation method embodied in a computer readable medium, the modulation method including the steps of:
   selectively inverting a signal pulse responsive to a first bit of the bit stream; and
   selectively delaying the signal pulse responsive to a second bit of the bit stream.

29. The computer readable carrier of claim 28, wherein the inverting step for implementation by the computer comprises the steps of:
   generating a phase signal responsive to the first bit; and
   selectively inverting the signal pulse responsive to the phase signal.

30. The computer readable carrier of claim 28, wherein the delaying step for implementation by the computer comprises the steps of:
   generating a delay signal responsive to the second bit; and
   selectively delaying the signal pulse responsive to the delay signal.

31. The computer readable carrier of claim 28, wherein the method implemented by the general purpose computer further includes the step of:
   time-hopping the selectively inverted and delayed signal pulse.

* * * * *